(12) United States Patent
Lovett

(10) Patent No.: US 6,378,580 B1
(45) Date of Patent: Apr. 30, 2002

(54) ARCH CUTTING JIG APPARATUS

(76) Inventor: Peter Lovett, 5613 Eton Ct., Alexandria, VA (US) 22312

( * ) Notice: Subject to any disclaimer, the term of this patent is extended or adjusted under 35 U.S.C. 154(b) by 0 days.

(21) Appl. No.: 09/519,564

(22) Filed: Mar. 6, 2000

Related U.S. Application Data

(60) Provisional application No. 60/124,012, filed on Mar. 12, 1999.

(51) Int. Cl.[7] ................................................ B27M 1/00
(52) U.S. Cl. ..................... 144/371; 33/27.01; 33/27.04; 33/32.3; 144/134.1; 144/136.1; 144/137; 144/144.1; 144/372; 144/286.5
(58) Field of Search ................................ 33/18.1, 19.3, 33/21.1, 27.01, 27.04, 32.3, 27.03, 27.032; 144/2.1, 134.1, 136.1, 137, 144.1, 136.95, 154.5, 371, 372, 286.1, 286.5; 409/182

(56) References Cited

U.S. PATENT DOCUMENTS 5,038,841 A * 8/1991 Larmon ...................... 144/371

* cited by examiner

Primary Examiner—W Donald Bray

(57) ABSTRACT

A jig apparatus that allows one to cut arches in a work piece quickly and efficiently. It is comprised of a bar that has sliding adjustable clamps that secure a cable which go around pulleys on a router or other cutting device that when the cable is pulled taut, creates a path for the router or other cutting device to follow while it cuts thus cutting an arch into the work piece. Prior to this apparatus one would have to cut this arch with a template which had been previously tooled. This jig apparatus creates a template and cut all in one step.

16 Claims, 5 Drawing Sheets

ARCH CUTTING JIG APPARATUS

REFERENCE TO RELATED APPLICATIONS

Reference to PROVISIONAL PATENT—APPLICATION No. 60/124,012 FILLING DATE Mar. 12, 1999.

BACKGROUND OF INVENTION

Although there are many different jigs or devices made to make different size circles, there is no such item to make an arch. An arch differs from a circle in that it may vary in its proportions even as an elipse varies from a circle. This arch is not just an enlarged section of a circle, but may be a portion of an elipse. There are no other jigs available for purchase, that are made to cut arches with a router or other cutting tools.

In the production of decorative arches that are used at the top of a bookcase, for instance, the width of the bookcase determines the width of the arch. If there are varying size widths, one would need varying sized arches. If the difference in widths is large, for example 12", a matching arch in a set of bookcases will be cut higher into one stock than on the other. If the center of the arch needs to maintain a reveal, such as 2", the two arches will need to vary in their spread. This jig is able to adjust to that change quickly and readily. Consider the difference in the performance of a regular miter box and a compound miter box. Both will cut a single 45 degree angle, but the compound miter box can cut a compound miter required to solve specialized crown moulding installation problems. The latter would create a double angle cut. So it is with the arch cutting jig, in that it can cut an arch out of a compound-circle, rather than just a simple circle. For the cabinetmaker to make an arch with the use of present technology, he must use one of three methods. [1] He must freehand an arch on his work piece or pattern, [2] use a bent thin and narrow piece of wood to create the arch and trace it on his work piece or pattern, or [3] create a jig with a pair of nails and a string and using a pencil, trace the arch onto the work piece or pattern. Each of these present methods require him to draw, cut shape or sand to a finished product and possibly cut again if he is using a pattern, to finally get the desired result. At the end of a considerable amount of time he has one arch done. If the arches are to be all the same on the bookcase, this product can be used as a pattern as well as to cut the other arches from it. But if the arches vary, even by a few inches, one would have to go through this long process over and over again. It should be appreciated that there is a need for a quick, accurate, and easily adjustable arch cutting jig apparatus.

Method # 3 is a step above free-handing each arch for it allows you to create many accurately drawn arches. By taking two nails and tacking them into a piece of wood a specified distance apart you can then take a loop of string, whose diameter is larger than the distance of the two nails and circumvent the two nails, thus creating a jig. By putting a pencil against the upper edge of string, one can draw a perfect arch from nail to nail. The arch cutting jig apparatus uses this same principle to create a pathway for the cutting tool's bit to follow. By using a cutting tool, it creates a 90 degree cut which thereby creates a finished product quickly and efficiently. This arch cutting jig apparatus fills the need that exists in the making of multi-sized arches.

BRIEF SUMMARY OF INVENTION

There is a need today for a quick, efficient, and variable arch cutting jig. Rather than drawing and cutting arches by hand, this jig allows one to set up the desired arch and cut it quickly and cleanly with a router or other cutting device, creating a sharp detailed arch. Present methods allow one to only trace cut by hand, and refine with a sander to get to the desired product. This is tedious and time consuming, especially if there are multiple, varying—sized arches to make.

DETAILED DESCRIPTION OF INVENTION

The following description of the preferred embodiment of the invention is not to be taken in a limiting sense, but is made merely for the purpose of illustrating the general principles of the invention. The following detailed description is a suitably contemplated mode of carrying out the present invention. The spirit of the concept of this jig apparatus may be expressed in ways not mentioned here. One must interpret by an overall assesment.

Figure 1:
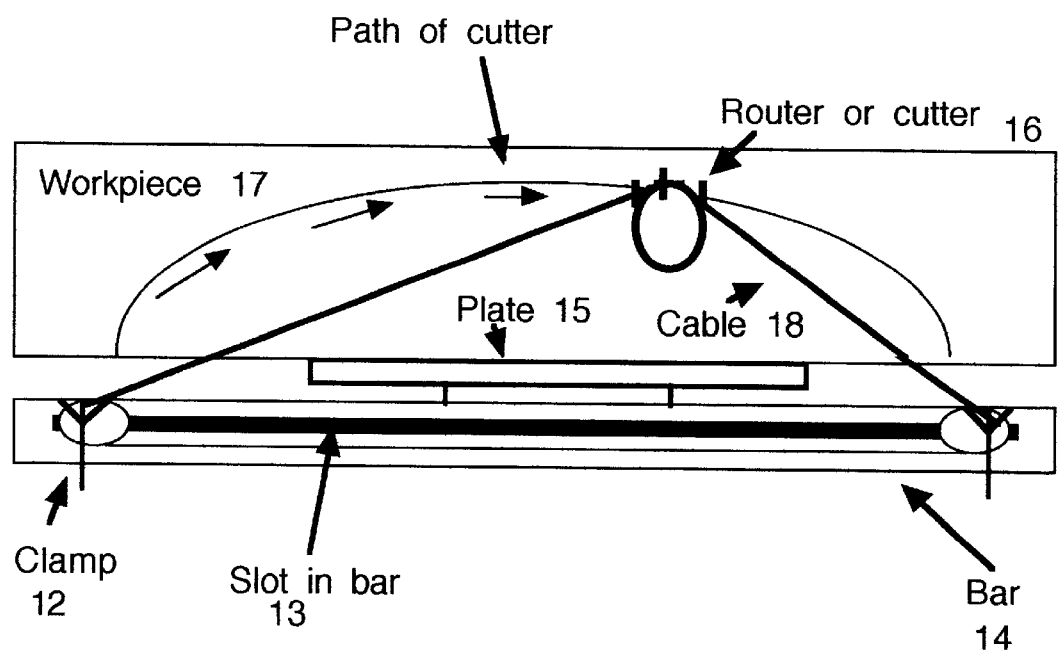
FIG. 1 is a plan or top view of a router showing various parts as per invention.
Figure 2:
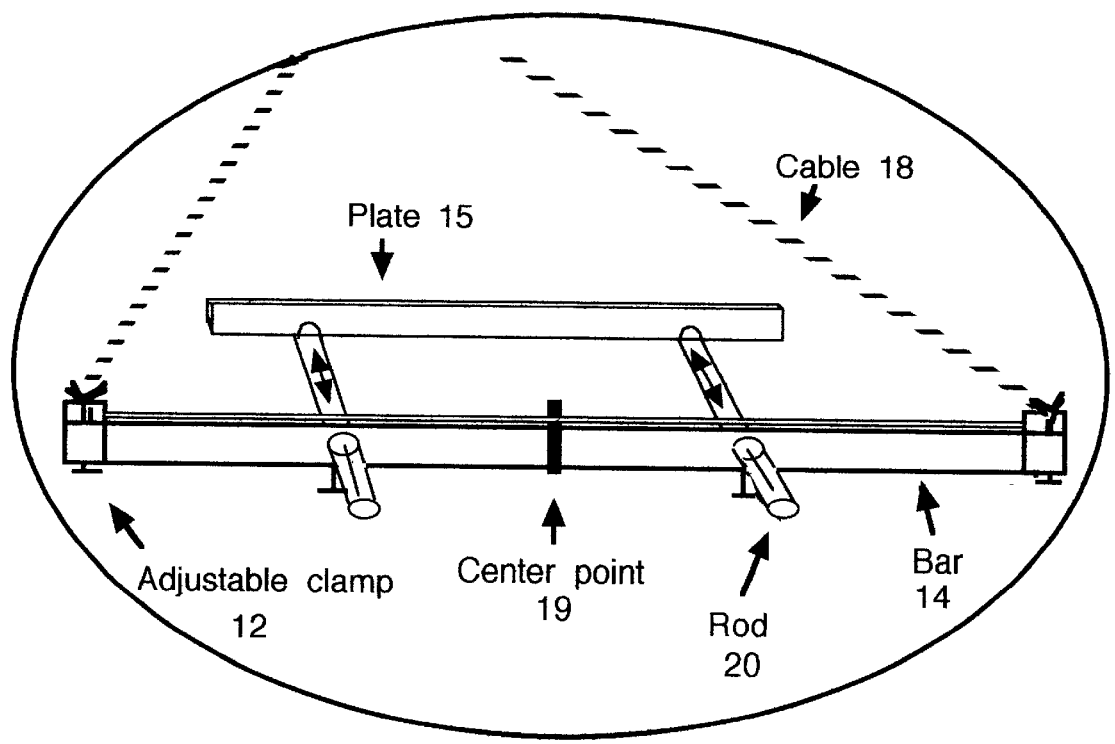
FIG. 2 is a perspective view of the Bar and Plate Assembly of FIG. 1.
Figure 3:
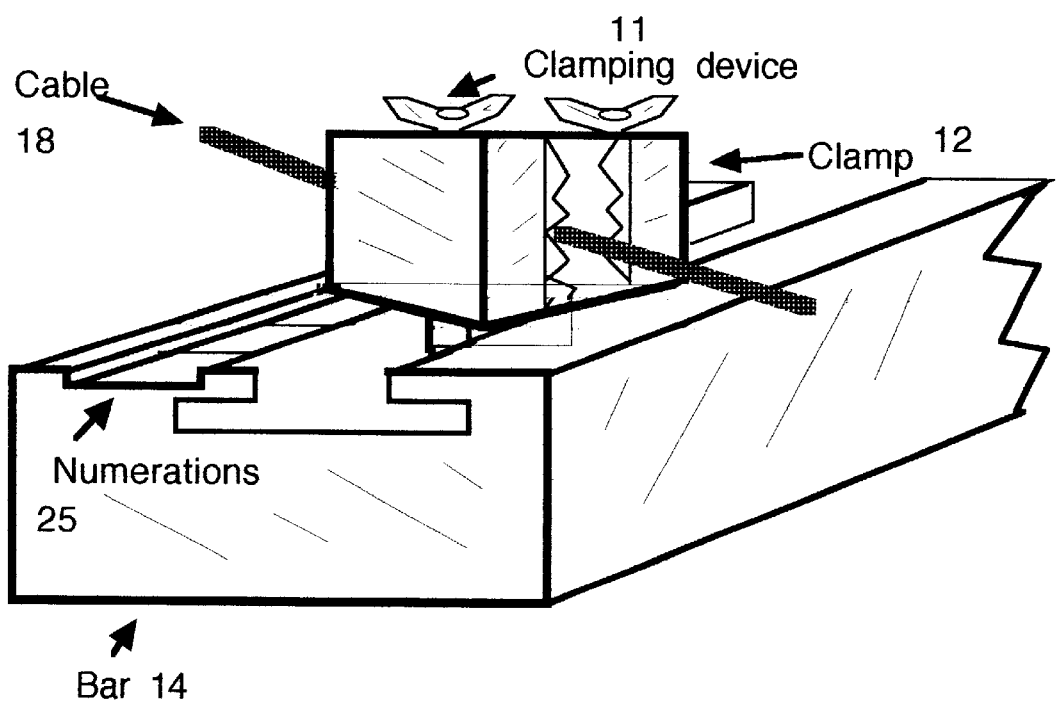
FIG. 3 is a perspective view of the Bar cross-section of FIG. 1.

With reference now to the drawings and particularly to FIG. 1, the arch cutting jig apparatus is comprised of a bar 14 wooden or aluminum, having a slot 13 [See FIG. 3] which receives a sliding clamp 12. There are two sliding clamps 12 one on either side of the length-wise center point 19 [FIG. 2] of the bar. This present bar is 72" in length. The other dimensions of bar 14, thickness and depth, should be strong enough for the pressure exerted by the cutting tool 16 pulling against the bar 14. Wood should be at least 1" by 2", respectively, and made from maple or a similar dense hardwood. Aluminum should be at least 1½" by 1½".

Figure 4:
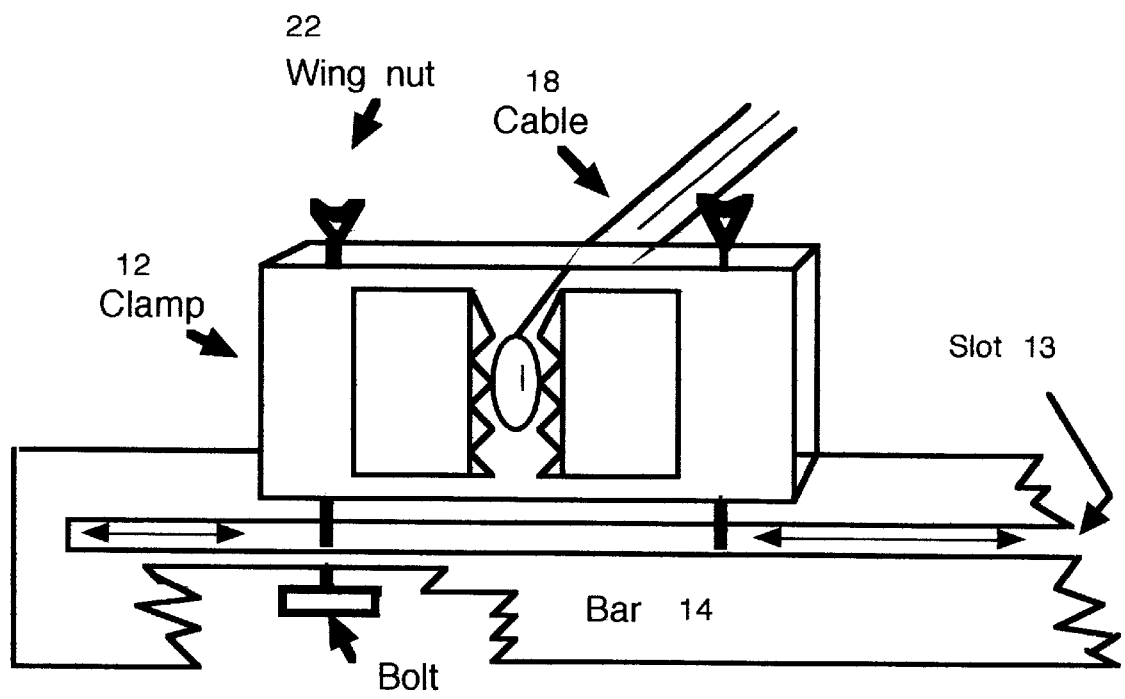
FIG. 4 is a perspective view of the Sliding Clamp or Holding Device of FIG. 3.

The center point 19 [FIG. 2] of the bar 14 is marked as a fixed zero with reversing numerations 25 [FIG. 3] fixed above the slot 13 to indicate the position of the sliding clamps 12 to ¹⁄₁₆" increments. In this instance, the numerations go from 0" to 36" in either direction from the center point 19. With this setup, the clamps 12 are able to move to equal positions from the center point 19, thus creating a symetrical cut in workpiece 17. In this application, the clamps 12 represent the two nails of method # 3, mentioned in the background of invention section. Reiterating this concept, the nails are tacked at a specified distance apart into the workpiece. Circumvent the two nails with a loop of string, whose diameter is greater than the distance between those two nails. Then using a pencil to draw, run the pencil along on the upper inner edge of the string, thus drawing an arch on the work piece. On the arch cutting jig apparatus, the clamps 12 substitute for the nails, but because they are moveable and slide, they are adjustable to different sized arches. The clamps 12 clamp in two directions. One way is to clamp to the bar 14 to prevent it from sliding during operations. This is done with a ³⁄₁₆" carriage bolt 21 on either side of the clamp 12 with a wing nut 22 securing it to the bar 14 [See FIG. 4.] The other direction that it clamps is through the upper center of the clamp 12 through a pair of toothed jaws [See FIG. 3] Through these jaws runs a wire cable 18

[at least 1/8" thick] that runs from one clamp 12 to the other clamp 12. This cable 18 is at least 120" long to accommodate the different size arches that will be cut. The cable 18 represents the upper portion of the string mentioned in method #3.

Figure 5:
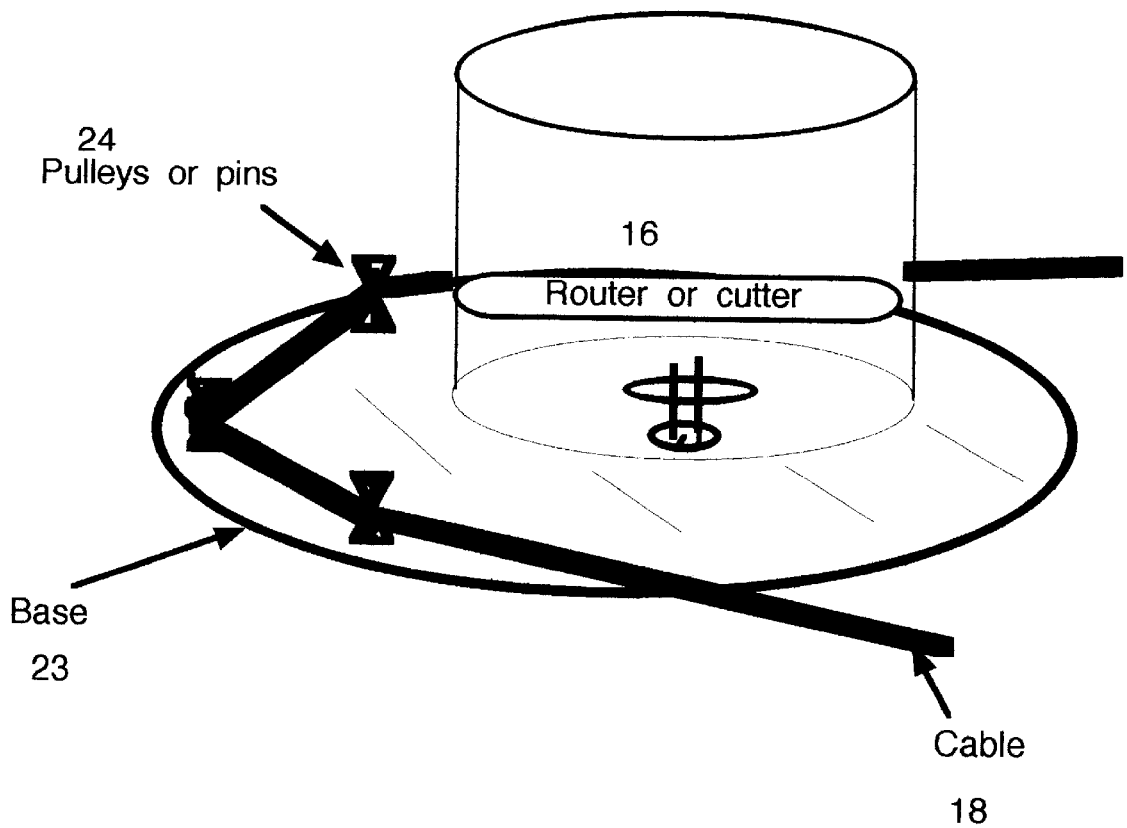
FIG. 5 is a perspective view of the Pulleys mouted to the router base.

The arch cutting jig is an apparatus in which one can use one's own router or cutting device 16, although a plunge router is recommended. The router 16 is used in the jig but is purchased separately from the invention. Included with the invention are three pulleys 24 that are attached to the front upper edge of the router 16 [FIG. 5] in this application they are comprised of plastic with a hole down the center, attached with a 1¼" screw that is tapped into the base of the router 16 the pulleys 24 are loose so that they may spin as necessary. These pulleys 24 will project perpendicularly up from the top of the router base 23. The cable 18 will now pass through the left-hand clamp 12, around the three pulleys 24, then through the right-hand clamp 12. [See FIG. 5]

Now refering to FIG. 2 one other feature that the arch cutting jig apparatus has is an adjustable plate 15 that extends either side of the center point 19 and parallel to to the bar 14 on the upper side. The plate 15 allows you to adjust the height of the cut into your workpiece 17. When combined with the width adjustment of the clamps 12, one is able to create different eliptical paths for the router 16 to follow. This plate 15 made of aluminum here, is centered by length to the bar 14 through the use of two perpendicular adjustable rods 20 These rods 20 project through holes in the bar 14 and are secured by two thumb screws or wing nuts 22 from a perpendicular direction underneath the bar 14, thus making them adjustable for different size needs. [See FIG. 2] An example would be an 18" plate 15 extending 9" either side from the center point 19, secured with 10" rods 20 adjusting through holes in the bar 14.

The arch cutting jig apparatus is intended to be mounted to a flat surface such as a work bench which is large enough to accommodate the workpiece 17 and jig it can be attached with screws through pre-drilled holes at the end and the middle of the bar 14.

To actually cut an arch on this jig, let us look at FIG. 1 place workpiece 17 above the plate 15 and center workpiece 17 lengthwise on the bar 14. Make your chosen adjustments to the rods 20 and to the clamps 12. Secure them and then secure your workpiece 17 and your jig apparatus. Refering to FIG. 5, set the router 16 with the cable 18 around the pulleys 24 and place the router base 16 firmly to the furthest most left-hand side of the workpiece face 17 while you keep the cable 18 tight, pulling away from the bar 14 and the right-hand clamp 12. While keeping pressure on the router 16 against the cable 18, you will create a triangle with the bar 14 as the bottom of the triangle and the cable 18 as the upper two sides. While maintaining pressure on the router 16 and keeping tension on the cable 18 plunge the bit into the surface of the workpiece face 17 and move to the right following the path created by the tensioned cable 18. See FIG. 1. The tension on the cable 18 is what establishes the path of your arch and maintaining the tension of the cable 18 is what secures the integrity of your finished product. Removing a ¼" depth of cut into your workpiece 17 each time will allow you to maintain a manageable degree of accuracy. The perpendicular cut of the router 16 and the tension on the cable 18, maintains the proper pattern and will enable you to make a quick and clean-cut arches that requires little or no finishing. Thus after you have initially set up your jig you may make repeated duplicates in a very short time. With slight adjustments to your jig set-up, you can easily make the various arches necessary for your cabinets, quickly and easily.

I claim:

1. An apparatus for cutting a workpiece comprising: an elongate support means for holding a flexible guiding element; means for cutting said workpiece having guide means thereon for engaging said flexible element.

2. The apparatus of claim 1 wherein said flexible guiding element is an elongate cable adjustably mounted on said support means.

3. The apparatus of claim 2 wherein said elongate cable is adjustably mounted on said support by moveable clamping elements.

4. The apparatus of claim 1 wherein said support means comprises a slotted bar.

5. The apparatus of claim 4 wherein said clamping elements are disposed for movement along said bar.

6. An arch cutting jig comprising:
   1] a bar;
   2] a scale/numerical measuring means;
   3] flexible guiding means attachable to said bar;
   4] a cutter; said cutter including a means for engaging said flexible guiding means; wherein said cutter is translatable over a path defined by said fexible guiding means to cut a workpiece.

7. An arch cutting jig of claim 6 including a bar, wherein said bar is slotted for receiving clamps that adjustably secure said flexible guiding means.

8. The jig of claim 7 wherein said clamps are slideably adjustable on said slotted bar and include means for securely locking said clamps along the length of the bar, whereby said cable can be adjusted to varying lengths.

9. A slotted bar of claim 7 comprising of a slotted bar that has sliding adjustable clamps or other means for securing devices; these clamps or securing devices can slide from opposite directions from the center of said bar, and be securely locked in place thereby allowing the width of the arch cutting pattern to be adjusted.

10. A sliding adjustable clamp of claim 8, wherein the said clamps or securing devices may have spring loaded jaws to allow the cable to be adjustable.

11. An arch cutting jig of claim 7, including an elongated cable that is held in place by said spring loaded clamps.

12. A length of cable of claim 11, wherein said elongated cable is held by said clamps and passes around pins or pulleys that are anchored in a cutting device to hold the cable in position while cutting the arch.

13. An arch cutting jig of claim 6 wherein the bar has an adjustable plate; wherein said plate, having at least two through openings therein; that will receive fixed rods; said rods go through openings, one for each rod, that are in the base of the bar, including means for securing said rods.

14. The apparatus of claim 13, including means for attaching the plate to the bar.

15. The slotted bar of claim 7 has a center point from which numerical measuring devices or gauges go out in opposite directions from that center point to enable one to determine the arch's dimension.

16. A method of cutting a workpiece comprising: providing an elongate support means for holding a flexible guiding element thereon; providing means for cutting said workpiece having guide means thereon for engaging said flexible element; moving said cutting means along said flexible guiding element to cut said workpiece.

\* \* \* \* \*